United States Patent
Butka et al.

(10) Patent No.: US 6,381,517 B1
(45) Date of Patent: Apr. 30, 2002

(54) METHOD AND APPARATUS TO ANALYZE ACCESSOR PERFORMANCE

(75) Inventors: David J. Butka; Raymond Yardy, both of Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/775,222

(22) Filed: Feb. 1, 2001

(51) Int. Cl.[7] .............................................. G05B 19/04
(52) U.S. Cl. ...................... 700/247; 700/245; 700/246; 700/251; 700/258; 700/260; 701/23; 701/14; 701/30; 318/568.1; 318/568.12; 713/1; 360/92; 360/191; 360/30.45; 360/30.49; 360/30.46; 360/30.31; 414/273; 414/280; 414/807; 414/281; 414/753.1
(58) Field of Search .................. 700/245–249, 700/251, 258, 260–261, 218; 360/92, 191, 30.31, 30.45, 30.46, 30.49; 414/273, 280, 807, 281, 753.1; 701/23, 14, 30; 713/1; 711/111–114, 159; 369/30.31; 901/46; 710/1

(56) References Cited

U.S. PATENT DOCUMENTS

| | | | |
|---|---|---|---|
| 4,908,777 A | | 3/1990 | Wolfe .......................... 364/513 |
| 5,065,265 A | * | 11/1991 | Pierrat .......................... 360/92 |
| 5,287,459 A | * | 2/1994 | Gniewek ...................... 711/111 |
| 5,331,232 A | | 7/1994 | Moy et al. .............. 318/568.11 |
| 5,336,030 A | * | 8/1994 | Ostwald et al. ............. 414/277 |
| 5,345,350 A | * | 9/1994 | Ellis et al. ..................... 360/92 |
| 5,388,946 A | * | 2/1995 | Baur .......................... 606/130 |
| 5,412,791 A | * | 5/1995 | Martin et al. |
| 5,421,697 A | * | 6/1995 | Ostwald ...................... 414/281 |
| 5,449,229 A | * | 9/1995 | Aschenbrenner et al. 414/753.1 |
| 5,471,561 A | * | 11/1995 | Cowgill et al. ............. 312/283 |
| 5,479,581 A | * | 12/1995 | Kleinschnitz ............... 700/247 |
| 5,500,803 A | * | 3/1996 | Munro et al. ................ 700/218 |
| 5,502,811 A | * | 3/1996 | Ripberger ..................... 700/99 |
| 5,504,873 A | * | 4/1996 | Martin et al. ................ 711/111 |
| 5,546,315 A | * | 8/1996 | Kleinschnitz ............... 700/247 |
| 5,613,154 A | * | 3/1997 | Burke et al. .................... 710/1 |
| 5,619,644 A | | 4/1997 | Crockett et al. ........ 395/183.21 |
| 5,622,470 A | * | 4/1997 | Schaefer et al. ............ 414/807 |
| 5,664,146 A | * | 9/1997 | Bolin et al. .................. 711/115 |
| 5,794,238 A | * | 8/1998 | Gural ............................. 707/6 |
| 5,872,672 A | | 2/1999 | Chlinwnyj et al. ....... 360/77.12 |
| 5,894,461 A | * | 4/1999 | Fosler et al. ............. 369/30.31 |
| 5,914,919 A | | 6/1999 | Fosler et al. .................. 369/34 |
| 5,946,160 A | | 8/1999 | Ohashi ......................... 360/92 |

(List continued on next page.)

FOREIGN PATENT DOCUMENTS

DE   38 01 397 A1 * 8/1989

OTHER PUBLICATIONS

Benchmark, DLT7 Autoloader installation adn operations guide, 2001, Internet.*
Owen et al. A modular re–configurable approach to the creation of flexible manufacturing cells for eductional purposes, 1997, Internet, pp. 1369–1374.*
Sharpe, Brookdale computer users goup, inc. Lincroft, NJ, 2000, Internet.*

Primary Examiner—William A. Cuchlinski, Jr.
Assistant Examiner—McDieunel Marc
(74) Attorney, Agent, or Firm—Dale F. Regelman (57) ABSTRACT

An automated data storage system which comprises one or more robotic accessors movably disposed therein, each such accessor including a revolving memory buffer and a velocity control program, wherein the velocity control program stores operational data regarding the gripping and pivot mechanisms disposed on the accessor. A method to diagnose the cause of an accessor failure by downloading and analyzing the operational data stored on the defective accessor's revolving memory buffer.

26 Claims, 7 Drawing Sheets

U.S. PATENT DOCUMENTS

| | | | |
|---|---|---|---|
| 5,970,030 A | * 10/1999 | Dimitri et al. | 369/30.46 |
| 6,023,709 A | 2/2000 | Anglin et al. | 707/204 |
| 6,029,230 A | * 2/2000 | Ng | 700/159 |
| 6,052,341 A | * 4/2000 | Bingham et al. | 711/112 |
| 6,120,230 A | * 9/2000 | Brown | 414/273 |
| 6,262,863 B1 | * 7/2001 | Ostwald et al. | 360/92 |
| 6,295,578 B1 | * 9/2001 | Dimitroff et al. | 711/114 |
| 6,298,439 B1 | * 10/2001 | Beglin | 713/1 |
| 6,304,798 B1 | * 10/2001 | Carpenter | 700/258 |

* cited by examiner

METHOD AND APPARATUS TO ANALYZE ACCESSOR PERFORMANCE

FIELD OF THE INVENTION

The present invention relates to an apparatus and method to determine and store certain operational data regarding the historical performance of various gripping and pivot mechanisms disposed on a robotic accessor disposed within an automated data storage system. The present invention further relates to an apparatus and a method to access and graphically depict that stored historical performance data to assist the diagnosis of the cause of an accessor failure.

BACKGROUND OF THE INVENTION

Automated media storage libraries are known for providing cost effective access to large quantities of stored media. Generally, media storage libraries include a large number of storage slots on which are stored portable data storage media. The typical portable data storage media is a tape cartridge, an optical cartridge, a disk cartridge, and the like. One (or more) accessor typically accesses the data storage media from the storage slots and delivers the accessed media to a data storage drive for reading and/or writing data on the accessed media. Suitable electronics both operate the accessor and operate the data storage drives to transmit and/or receive data from an attached on-line host computer system.

In a conventional automated media storage library, the storage slots are arranged in a planar orthogonal arrangement forming a "wall" of storage slots for holding data storage media. The plane may be a flat plane, or may be a cylindrical plane. To double the storage capacity, two "walls" of storage slots may be provided on either side of the accessor.

A number of different companies manufacture automated media storage libraries today, each model displaying various different features. One example is the IBM 3494 Media Storage Library. Some of the automated media storage libraries have dual or multiple accessors to provide a level of redundancy.

Occasionally, an accessor may become unavailable, for example, if a component of the accessor must be replaced or repaired. In the event of an accessor failure, the cause of the failure must first be ascertained before a repair can be made. What is needed is an apparatus and a method to store operational information about each accessor, and an apparatus and a method to make that stored information readily available in the event of an accessor failure.

SUMMARY OF THE INVENTION

Applicants' invention includes an automated data storage system comprising one or more accessors for retrieving a plurality of data storage media stored in a plurality of storage slots, and for delivering that retrieved data storage media to one or a plurality of data storage drives for reading and/or writing data thereon. Each such accessor comprises an accessor control card, a revolving memory buffer resident on the accessor control card, and a velocity control program resident on the accessor control card.

In one embodiment of Applicants' invention, each such accessor further includes a first gripper, a first gripper motor disposed on the first gripper, and a first gripper motor tach disposed on the first gripper motor, such that the first gripper tach provides, at a first time, first gripper motor tach information to the velocity control program. Each such accessor further includes a pivot motor and a pivot motor tach disposed on the pivot motor, such that the pivot motor tach provides, at a first time, pivot motor tach information to the velocity control program. In this embodiment, the velocity control program stores the first gripper motor tach information and the pivot motor tach information in the revolving memory buffer.

In other embodiments, Applicants' accessor further includes a second gripper, a second gripper motor disposed on the second gripper, and a second gripper motor tach disposed on the second gripper motor, such that the second gripper motor tach provides, at a first time, second gripper motor tach information to the velocity control program. In these alternative embodiments, the velocity control program stores the first gripper motor tach information, the second gripper motor tach information, and the pivot motor tach information in the revolving memory buffer.

Applicants' invention also includes a method to diagnose the failure of an accessor using the information stored in the revolving memory buffer of that defective accessor. When using accessors having two gripper mechanisms, Applicants' method includes generating first gripper motor tach information using the first gripper motor tach; storing a first tach position, a first demand velocity, a first PWM voltage, and calculating and storing a first actual velocity; generating second gripper motor tach information using the second gripper motor tach; storing in said revolving memory buffer, a second tach position, a second demand velocity, a second PWM voltage, and calculating and storing a second actual velocity; generating pivot motor tach information using the pivot motor gripper tach; storing a third tach position, a third demand velocity, a third PWM voltage, and calculating and storing a third actual velocity; generating at a second time updated first gripper motor tach information, updated second gripper motor tach information, and updated pivot motor tach information; and determining if an accessor failure has occurred.

In the event an accessor failure occurs, the operational data stored in the accessor's revolving memory buffer can be downloaded to an external computer. That downloaded data can then be graphically displayed in order to diagnose the cause of the accessor failure.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Figure 1:
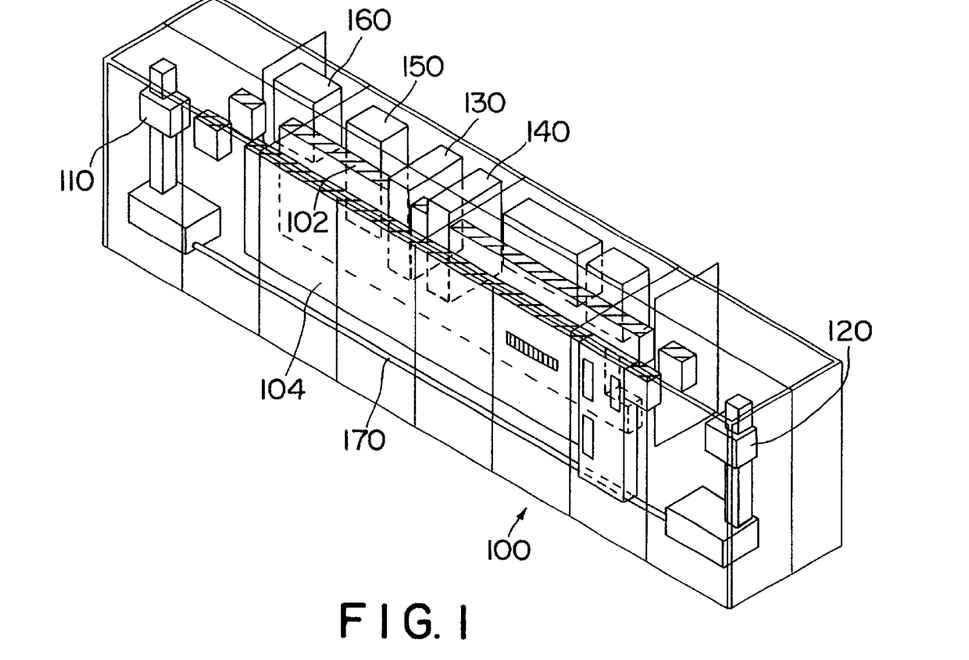
FIG. 1 is a perspective view of Applicants' automated data storage system.

Referring to FIG. 1, automated data storage system 100 is shown having a first wall of storage slots 102 and a second wall of storage slots 104, Data storage media are individually stored in these storage slots. The data storage media are housed within a portable container, i.e. a cartridge. Examples of such data storage media include magnetic tapes, optical disks of various types, including ROM, WORM, and rewritable, and the like.

Applicants' invention comprises an automated data storage system which includes one or more accessors, such as accessors 110 and 120. An accessor is a robotic device which accesses the data storage media from storage slots 102 or 104, delivers that accessed media to data storage drives 130/140 for reading and/or writing data thereon, and returns the media to the proper storage slot. As shown in FIG. 1, accessors 110 and 120 travel bi-directionally along rail 170 in an aisle disposed between first wall of storage slots 102 and second wall of storage slots 104.

Accessor control 160 controls accessors 110 and 120. Operator input station 150 permits an operator to communicate with automated data storage system 100.

Figure 2:
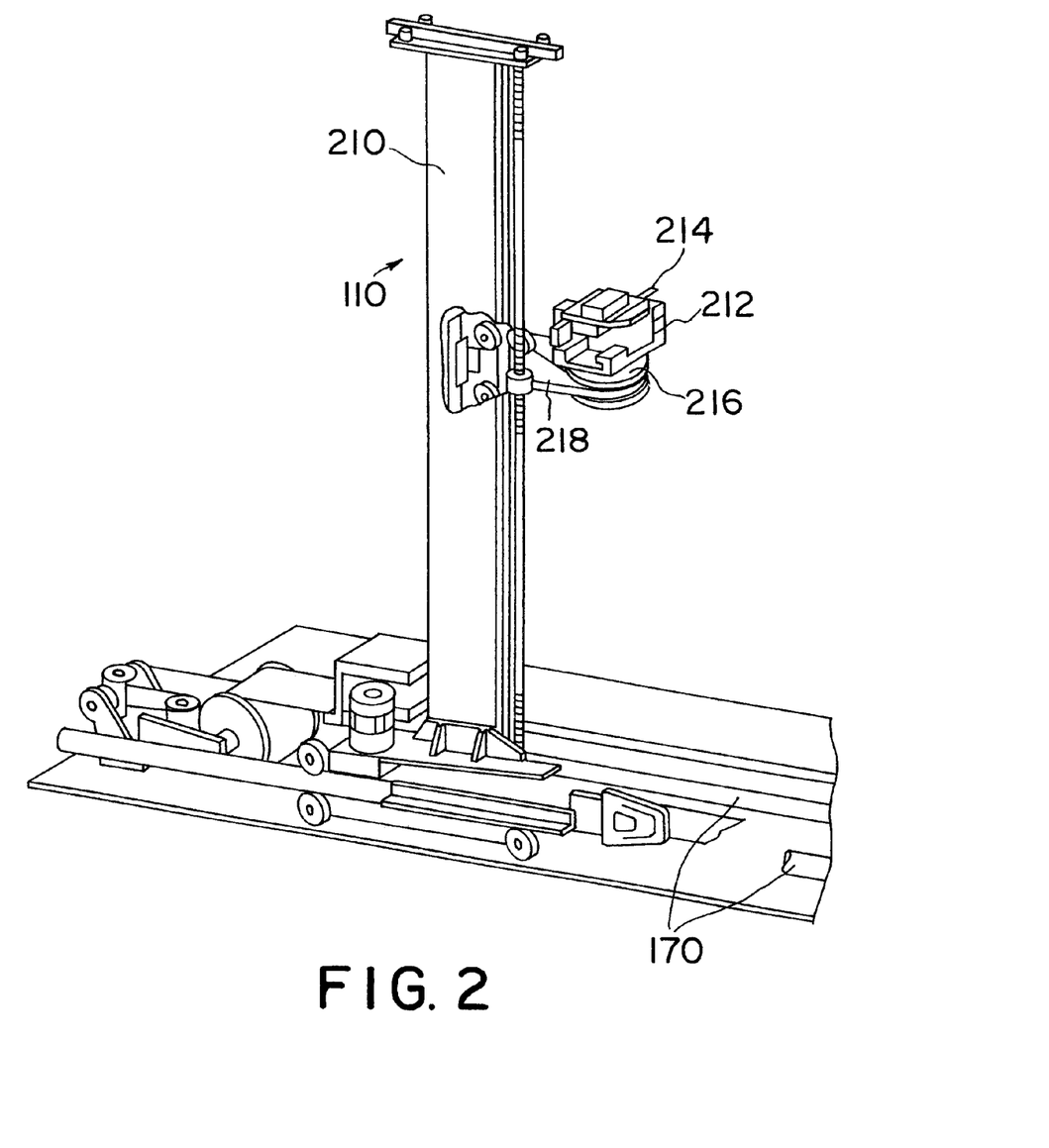
FIG. 2 is a perspective view of one embodiment of Applicants' accessor showing the first gripper, second gripper, and rotational mechanism.

Referring to FIG. 2, accessor 110 travels bi-directionally along rail system 170. In the embodiment shown in FIG. 2, rail system 170 comprises two parallel rails. Accessor 110 includes vertical pillar 210. Lifting servo section 218 moves vertically along pillar 210. In the two gripper embodiment shown in FIG. 2, accessor 110 includes first gripper 214 and second gripper 216. As discussed above, in other embodiments of Applicants' invention the accessors include a single gripper.

Accessor 110 rotates such that one gripper can access a data storage medium from, for example, first wall of storage slots 102 (FIG. 1), and then rotate to deliver that accessed medium to data storage drive 130 or 140 (FIG. 1). Therefore, accessor 110 includes a first gripper motor to actuate the gripping action of first gripper 214, a second gripper motor to actuate the gripping action of second gripper 216, and a pivot motor to effectuate rotation.

Figure 3:
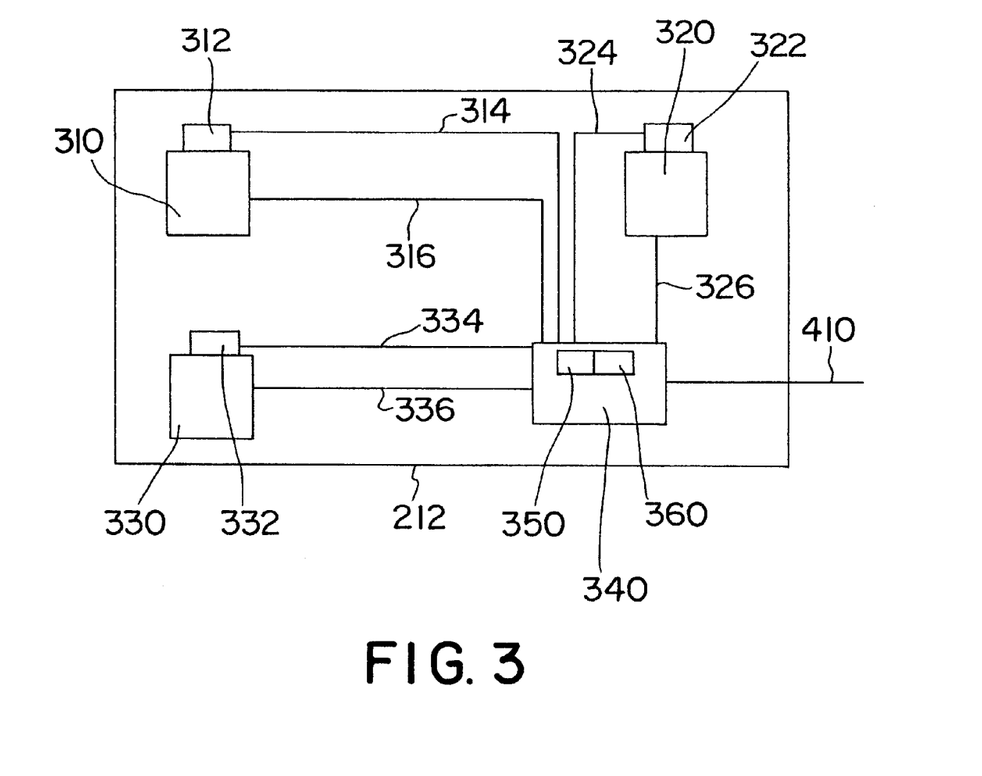
FIG. 3 is a block diagram showing the components disposed on Applicants' accessor control card.

In the embodiment shown in FIG. 3, accessor 110 includes first gripper motor 310, second gripper motor 320, and pivot motor 330. First gripper motor 310 actuates the gripping function of first gripper 214 (FIG. 2). First gripper motor connects to first gripper 214 by external shaft 311 (not shown in FIG. 3). Rotation of external shaft 311 in a first direction causes first gripper 214 to grasp a desired portable data storage cartridge. Rotation of external shaft 311 in a second, i.e. opposite, direction, causes first gripper 214 to release that portable data storage cartridge.

First gripper motor tach 312 is mounted on first gripper motor 310. First gripper motor tach 312 comprises a rotary encoder, sometimes called a digital tachometer, that generates first gripper motor tach information as external shaft 311 rotates. In a preferred embodiment, this first gripper motor tach information comprises a first digital output. Using this first digital output, the position and velocity of first gripper 214 can be ascertained.

Similarly, second gripper 320 motor actuates the gripping function of second gripper 216 (FIG. 2). Second gripper motor 320 connects to second gripper 216 by external shaft 321 (not shown in FIG. 3). Rotation of external shaft 321 in a first direction causes second gripper 216 to grasp a desired portable data storage cartridge. Rotation of external shaft 321 in a second, i.e. opposite, direction, causes second gripper 216 to release that portable data storage cartridge.

Second gripper motor tach 322 is mounted on second gripper motor 320. Second gripper motor tach 322 comprises a rotary encoder, sometimes called a digital tachometer, that generates second gripper motor tach information as external shaft 321 rotates. In a preferred embodiment, this second gripper motor tach information comprises a second digital output. Using this second digital output, the position and velocity of second gripper 216 can be ascertained.

Pivot motor 330 actuates the rotation function of accessor 110. Pivot motor 330 connects to accessor 110 by external shaft 331 (not shown in FIG. 3). Rotation of external shaft 331 in a first direction causes accessor 110 (FIG. 2) to rotate in a first direction. Rotation of external shaft 331 in a second, i.e. opposite, direction causes accessor 110 to rotate in the opposite direction.

Pivot motor tach 332 is mounted on pivot motor 330. Pivot motor tach 332 comprises a rotary encoder, sometimes called a digital tachometer, that generates pivot motor tach information as external shaft 331 rotates. In a preferred embodiment, such pivot motor tach information comprises a third digital output. Using this third digital output, the rotational position and rotational velocity of accessor 110 can be ascertained.

Referring again to FIG. 3, accessor 110 further includes accessor control card 340. Accessor control card 340 includes velocity control program 350 and revolving memory buffer 360. Velocity control program 350 controls the operation of first gripper motor 310, second gripper motor 320, and pivot motor 330.

Velocity control program 350 generates, and accessor control card 340 provides, operational commands to first gripper motor 310 via communication link 316. The first gripper motor tach information generated by first gripper motor tach 312 is provided to accessor control card 340 via communication link 314. This first gripper motor tach information is stored in revolving memory buffer 360 in the manner described below, and is available to velocity control program 350.

Velocity control program 350 generates, and accessor control card 340 also provides operational commands to second gripper motor 320 via communication link 326. The second gripper motor tach information generated by second gripper motor tach 322 is provided to accessor control card 340 via communication link 324, This second gripper motor tach information is stored in revolving memory buffer 360 in the manner described below, and is available to velocity control program 350.

Velocity control program 350 generates, and accessor control card 340 further provides operational commands to pivot motor 330 via communication link 336. The pivot motor tach information generated by pivot motor tach 332 is provided to accessor control card 340 via communication link 334. This pivot motor tach information is stored in revolving memory buffer 360 in the manner described below, and is available to velocity control program 350.

The storage of first, second, and pivot motor tach information continues in the manner described below until a servo error occurs. Analysis of this stored information assists in ascertaining the cause of the servo error. Analysis of such servo errors/failures generally requires examination of extensive data abstracted from the velocity control program. Because of the movement of the robotic accessors disposed within Applicants' data storage and retrieval system, however, it is nearly impossible to attach conventional measuring devices, such as oscilloscopes, to the accessors as they transport portable data storage media within the data storage and retrieval system. Applicants' invention, however, comprises a firmware-implemented data collection and storage mechanism, wherein hard-wired analytical instruments are not required.

As discussed above, a reach or pivot motion within Applicants' data storage and retrieval system is controlled by velocity control program 350. Of the three motors disposed on accessor 110, only one motor operates at any given time. Thus, only one operational function of accessor 110 occurs at a given time. For example, operation of first gripper 214 necessarily precludes operation of second gripper 216 or rotation of accessor 110. When any reach or pivot motion is started, an interrupt routine is activated and triggered at the end of each interrupt period. Applicants' invention includes embodiments wherein the interrupt period is as short as about 0.1 millisecond and as long as about 1.0 millisecond. In a preferred embodiment, the interrupr period is about 0.5 millisecond.

During the interrupt period, the velocity of the active motor is calculated and controlled based upon the current position and current velocity of the operational mechanism. As discussed above, both the position and velocity of the operational mechanism are determined by using the information provided by the tach disposed on that operational motor. During this period, the servo information is collected and stored in revolving memory buffer 360 disposed within accessor control card 340. More particularly, four 32 bit data objects are collected and stored in a revolving memory buffer located on the accessor control card. This buffer circulates until a robotics servo error occurs.

The stored data objects provide a snapshot of the servo/velocity motion of the reach or pivot mechanism immediately before the servo error occurs. Table I summarizes the 4 by 32 bit objects collected and stored. The values recited in Table I are in hexadecimal number format.

TABLE I

| Tach Position | Demand Velocity | Actual Velocity | PWM Voltage |
| --- | --- | --- | --- |
| 200009D3 | 21006408 | 22000000 | 26000046 |
| 200009D0 | 21006408 | 22000C19 | 29000046 |
| 200009CD | 21006408 | 22000F08 | 26000042 |
| 200009C9 | 21006408 | 220011E7 | 26000045 |
| 200009C4 | 21006408 | 22001473 | 26000048 |
| 200009BE | 21006408 | 22001749 | 26000049 |
| 200009B9 | 21006408 | 22001905 | 26000050 |
| 200009B3 | 21006408 | 2200187D | 2600005A |
| 200009AD | 21006408 | 22001942 | 26000055 |
| 200009A7 | 21006408 | 22001ADB | 26000051 |
| 200009A0 | 21006408 | 22001DD7 | 2600004D |
| 20000998 | 21006408 | 2200209F | 26000050 |
| 20000990 | 21006408 | 22002308 | 26000053 |

The Tach Position is the current tach reading at the 0.5 millisecond interrupt period. For example, if first gripper 214 (FIG. 2) is operational, first gripper motor tach 312 (FIG. 3) provides first gripper motor tach information to accessor node controller 340. Using this first gripper motor tach information, velocity control program 350 determines the Tach Position.

The Demand Velocity is the desired velocity based upon the current tach position. The Demand Velocity is calculated using the mass of the object to be moved, characteristics of the active motor, and the characteristics of the target to which the object to be moved. The mass of the object to be moved differs depending on the type of portable data storage cartridge being accessed. In addition, the Demand Velocity required to retrieve a portable data storage cartridge from a storage slot differs from that required to insert a portable data storage cartridge into a data drive unit. Typical Demand Velocity vs. Tach Position values are summarized in Table II. All values in Table II are in decimal format.

TABLE II

| Tach Position | Demand Velocity |
| --- | --- |
| 0 | 5333 |
| 1052 | 5304 |
| 1204 | 5304 |
| 1221 | 8334 |
| 1241 | 10866 |
| 1261 | 12911 |
| 1285 | 15002 |
| 1311 | 16978 |
| 1339 | 18877 |
| 1375 | 21068 |
| 1418 | 23417 |
| 1463 | 25600 |
| 3483 | 25600 |

The PWM Voltage is the pulse width modulated voltage calculated by velocity control program 350, and applied to the active motor in order to attain the desired Demand Velocity. The Actual Velocity is the motor velocity at the 0.5 millisecond interrupt interval determined using the information provided by the operational motor tach.

During robotics motion, first, second, and pivot motor tach information is stored. The storage process is halted at the time of a servo error. Using an external computer attached to automated data storage system 100 (FIG. 1), this 64 k memory area can be collected as raw binary data. In one embodiment, an external RS232 interface is provided by the library to allow collection of such library log data. The external computer used can be a personal computer, a mainframe computer, or a network of computers. In a preferred embodiment, a personal computer is used.

Figure 4A:
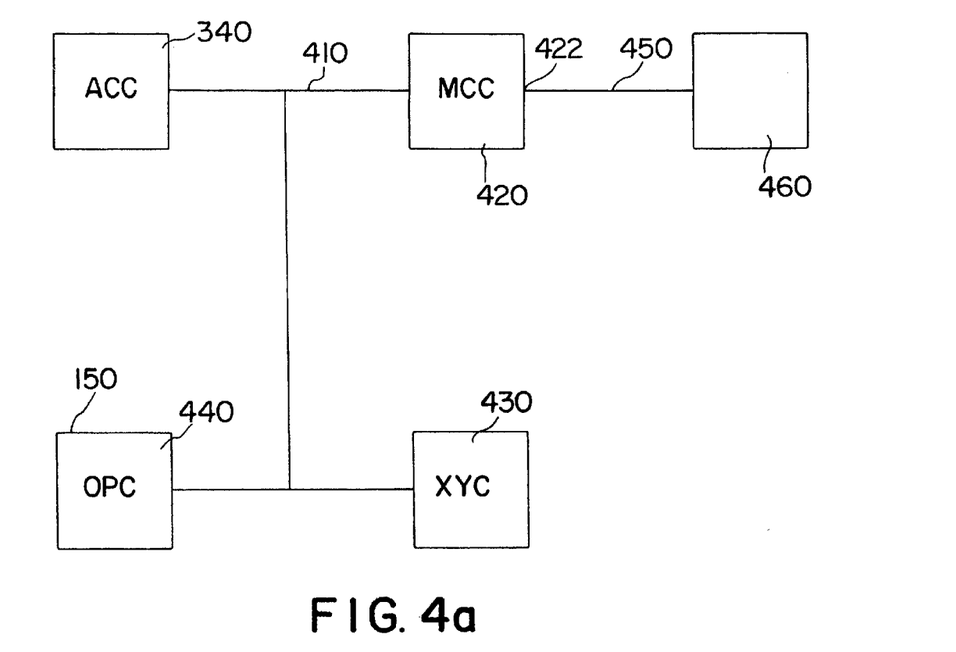
FIG. 4a is a block diagram showing a first embodiment of the interface between the control cards disposed within Applicants' automated data storage system and an external computer used to download operational data from the revolving memory buffer disposed on each of Applicants' accessors.

Referring to FIG. 4a, serial protocol bus 410 disposed within Applicants' automated data storage system is in communication with accessor control card 340, communications control card 420, X/Y movement control card 430, and operator control panel control card 440. In certain embodiments of Applicants' invention serial protocol bus 410 comprises an ethernet protocol bus or a CANBUS protocol bus. Accessor control card 340 is described above, and is disposed on accessor 110 (FIG. 2). X/Y movement control card 430 is disposed within system controller 160. Operator panel control card is disposed within operator control panel 150.

Figure 4B:
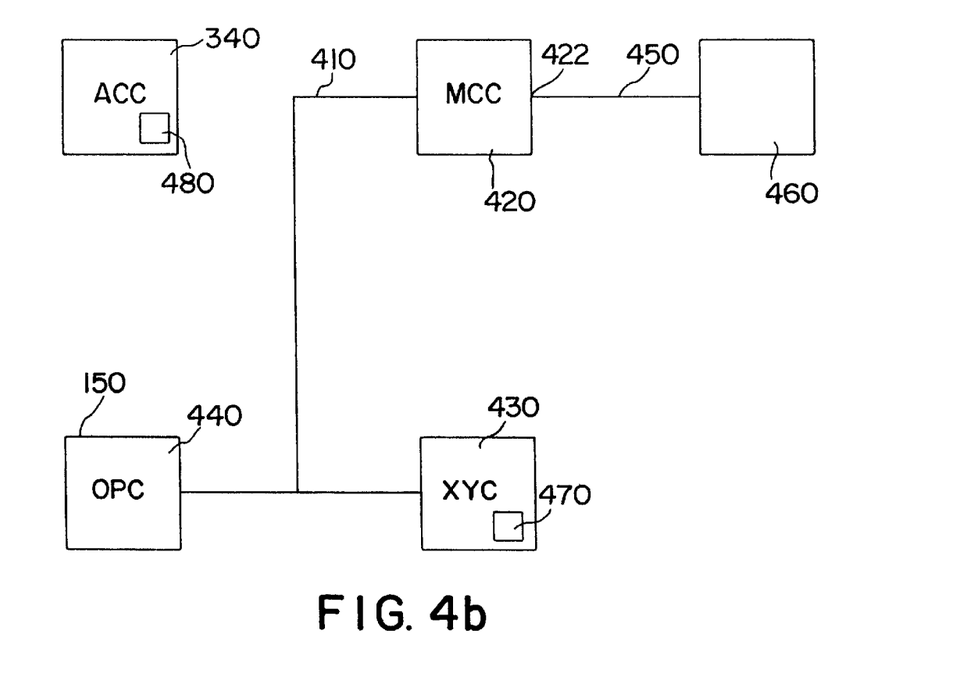
FIG. 4b is a block diagram showing a second embodiment of the interface between the control cards disposed within Applicants' automated data storage system and an external computer used to download operational data from the revolving memory buffer disposed on each of Applicants' accessors.

Referring to FIG. 4b, in another embodiment of Applicants' invention X/Y movement control card 430 further includes wireless communication device 470, and accessor control card 340 further includes wireless communication device 480. In this wireless communication embodiment, X/Y control card 430 provides control commands by wireless communication to accessor 110 (FIGS. 1 and 2) via accessor control card 340 disposed within accessor 110. In certain embodiments of Applicants' invention, such wireless communication is conducted over frequencies between about 800 MHz and about 1.0 GHz. In other embodiments, such wireless communication is conducted using emissions within the infrared spectrum.

Communication control card 420 includes external interface connection 422. Using external interface connection 422, the data stored in revolving memory buffer 360 resident on accessor control card 340 can be accessed by external computer 460. Communication link 450 connects external computer 460 and communication controller 420 via external interface connection 422. In various embodiments of Applicants' invention, communication link 450 comprises an RS 232 cable, a local area network, a private wide area network, a public wide area network, i.e. the Internet, and the like.

Once collected with externally attached computer 460, the raw binary data is then formatted and plotted by an application that runs on that computer. Such a preferred application is written in Visual Basic®. The MSGrid® object of the Visual Basic® tool kit is used to graphically plot the collected data. A grid is developed that takes each 4 times 32 bits entry from the binary log data and plots a running graphical image of the robotic servo motion.

Figure 5:
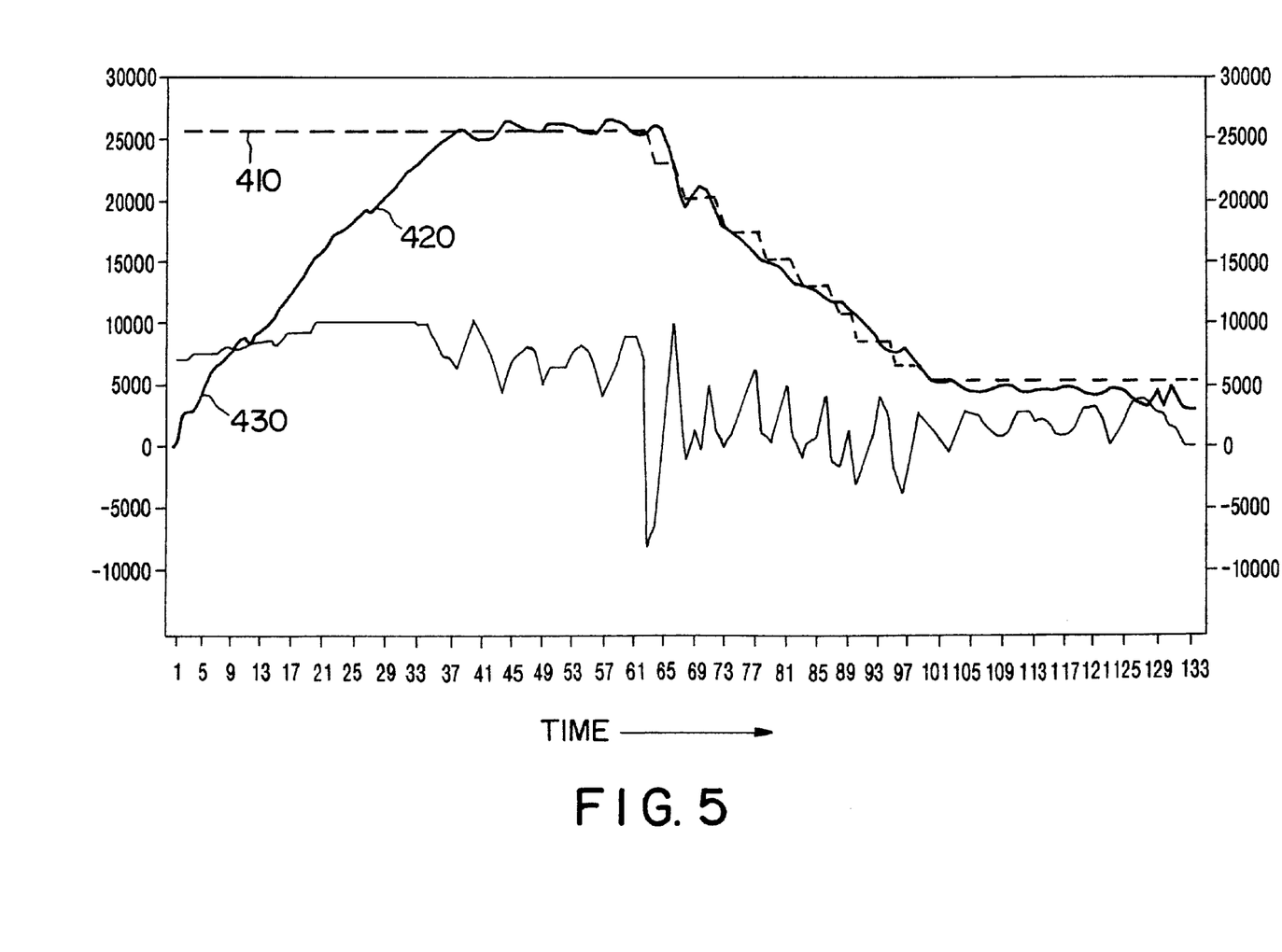
FIG. 5 shows a graphical display of operational data downloaded from the revolving memory buffer disposed on Applicants' accessor.

An example of such an analysis is shown in FIG. 5. The data graphically presented in FIG. 5 is plotted to resemble the appearance of an oscilloscope type output, but is completely constructed and plotted using the data collected and stored within the firmware of Applicants' automated data storage system.

Referring to FIG. 5, curve 410 shows the calculated Demand Velocity plotted versus time. Curve 420 shows the Actual Velocity plotted versus time. The Y axis units for the Demand Velocity and Actual Velocity are ticks of the motor tach per second. These ticks per second are determined from the information provided by the tach disposed on the operational motor. Curve 430 shows PWM Voltage plotted versus time. The Y axis units for the PWM Voltage is percentage of the available voltage times 100. For example, a value of "10,000"corresponds to 100% of the available voltage. By analyzing this plotted data, engineers can better diagnose the cause of a reach or a pivot servo failure.

Figure 6:
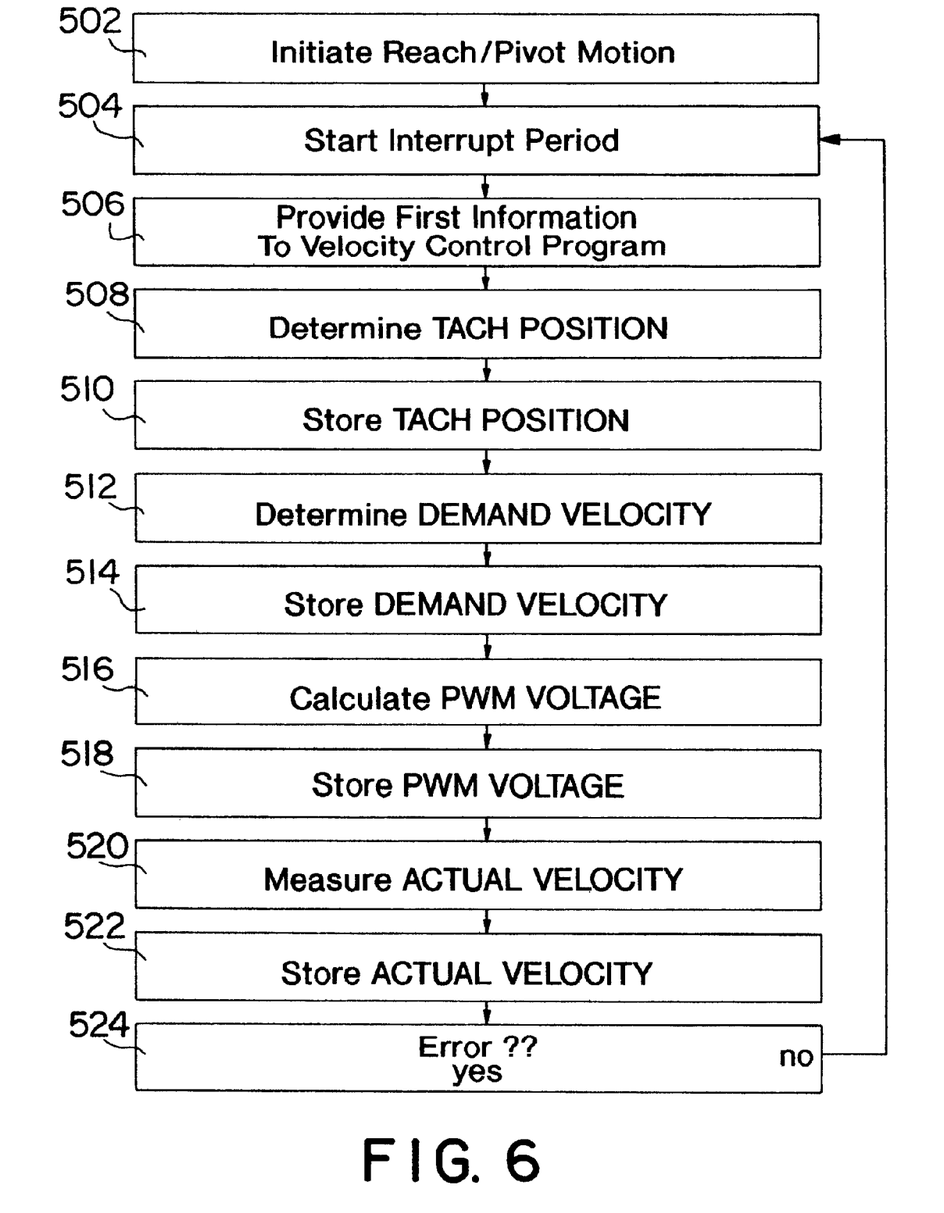
FIG. 6 is a flow chart showing the initial steps of Applicants' method to diagnose the cause of an accessor failure.

Referring to FIG. 6, the initial steps in Applicants' method to diagnose the cause of an accessor failure are graphically depicted. In Applicants' method, accessor 210 (FIGS. 1 and 2) is tasked to retrieve a certain portable data storage cartridge from its storage slot. First gripper 214 (FIG. 2) is activated to grasp that requested portable data storage cartridge. In step 502, the reach motion is initiated. As discussed above, only one of the motors disposed on the accessor 110 of accessor 210 is in operation at any given time. Therefore, during this reach operation, only first gripper motor 310 (FIG. 3) is in operation.

In accord with step 504, when operation of first gripper 214 is initiated, the initial interrupt period is started. At the end of that interrupt period, first gripper tach 312 provides first gripper motor tach information to velocity control program 350. Velocity control program 350 uses the provided first gripper motor tach information to ascertain the current Tach Position in step 508. In step 510, that current Tach Position is stored in revolving memory buffer 360.

In step 512 velocity control program 350 determines the Demand Velocity for first gripper 214. That determined Demand Velocity is stored in revolving memory buffer 360 in step 514. Based on the calculated Demand Velocity, velocity control program 350 determines the PWM voltage to be supplied to first gripper motor 310. In step 518, that PWM voltage is saved in revolving memory buffer 360. Based upon the first gripper motor tach information provided, velocity control program 250 then determines first gripper 214's Actual Velocity in step 520. In step 522, that Actual Velocity is then stored in revolving memory buffer 360.

Velocity control program 350 then compares the Actual Velocity to the Demand Velocity to ascertain if the reach motion is being properly performed. If no accessor failure is noted in step 524, a new interrupt period is initiated in accord with step 504, and the process is repeated. If no accessor failures occur, the process of receiving updated first gripper motor tach information from first gripper tach 312 at the end of each interrupt period continues, and the process continues to determine and store an updated Tach Position, an updated Demand Velocity, an updated PWM Voltage, and an updated Actual Velocity from that updated first gripper motor tach information. When the velocity control program 350 determines and stores an updated Tach Position, an updated Demand Velocity, an updated PWM Voltage, and an updated Actual Velocity, at the end of a subsequent interrupt period, that updated data is stored in memory buffer 360 such that oldest prior data for these variables is overwritten.

Figure 7:
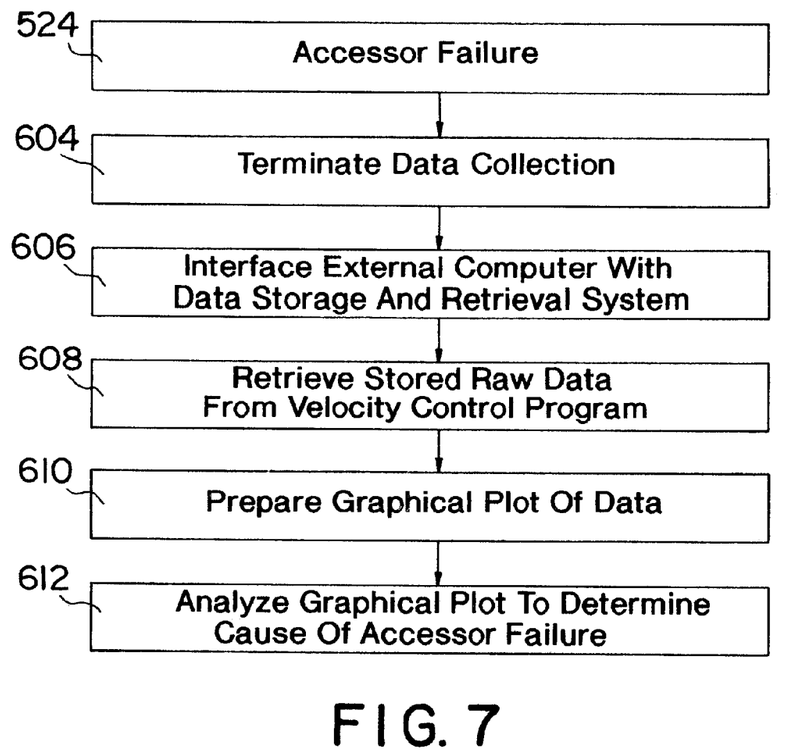
FIG. 7 is a flow chart showing additional steps in Applicants' method to diagnose the cause of an accessor failure.

In the event an accessor failure occurs, the process then loops to the steps shown in FIG. 7. Upon ascertaining an accessor failure in step 524, the generation and storage of an updated Tach Position, an updated Demand Velocity, an updated PWM Voltage, and an updated Actual Velocity, is terminated in step 604. Therefore upon the event of an accessor failure, the data residing in revolving memory buffer 260 comprises a history of the values for first gripper motor 310's Tach Position, Demand Velocity, PWM Voltage, and Actual Velocity data, up to the time of failure.

In step 606, external computer 460 (FIG. 4a) is connected to interface connection 422 (FIG. 4a) disposed within automated data storage system 100 (FIG. 1). In step 608, the data resident in revolving memory buffer 360 (FIG. 3) is downloaded to external computer 460 (FIG. 4a) via communication link 450 (FIG. 4a) and serial protocol bus 410 (FIG. 4a). In the wireless communication embodiment shown in FIG. 4b, the data resident in revolving memory buffer 360 is provided to X/Y control card 430 by wireless communication using wireless communication devices 470 and 480. The data is then provided to external computer 460 via serial protocol bus 410 and communication link 450.

In step 610, a graphical plot, such as that shown in FIG. 5, of that downloaded data is prepared and displayed. In step 612, that displayed data is used to diagnose the cause of the accessor failure.

While the preferred embodiments of the present invention have been illustrated in detail, it should be apparent that modifications and adaptations to those embodiments may occur to one skilled in the art without departing from the scope of the present invention as set forth in the following claims.

We claim:

1. An accessor for retrieving a plurality of data storage media stored in a plurality of storage slots in an automated data storage system and for delivering that retrieved data storage media to one or a plurality of data storages for reading and/or writing data thereon, said accessor comprising:

an accessor control card having a revolving memory buffer;

a velocity control program stored on said accessor control card;

a first gripper;

a first gripper motor disposed on said first gripper;

a first gripper motor tach disposed on said first gripper motor, wherein said first gripper tach provides at a first time first gripper motor tach information to said velocity control program;

a pivot motor;

a pivot motor tach disposed on said pivot motor, wherein said pivot motor tach provides at said first time pivot motor tach information to said velocity control program;

wherein said velocity control program stores said first gripper motor tach information and said pivot motor tach information in said revolving memory buffer.

2. The accessor of claim 1, further comprising:

a second gripper;

a second gripper motor disposed on said second gripper;

a second gripper motor tach disposed on said second gripper motor, wherein said second gripper tach provides at said first time second gripper motor tach information to said velocity control program;

wherein said velocity control program stores said first gripper motor tach information, said second gripper motor tach information, and said pivot motor tach information in said revolving memory buffer.

3. The accessor of claim 2, further comprising a wireless communication device.

4. The accessor of claim 2, wherein said velocity control program determines and stores in said revolving memory buffer:

a first tach position, a first demand velocity, a first PWM voltage, and a first actual velocity using said first gripper motor tach information;

a second tach position, a second demand velocity, a second PWM voltage, and a second actual velocity using said second gripper motor tach information; and a third tach position, a third demand velocity, a third PWM voltage, and a third actual velocity using said pivot motor tach information.

5. The accessor of claim 2, wherein said first gripper motor tach provides to said velocity control program updated first gripper motor tach information obtained at a second time, and wherein said second gripper motor tach provides to said velocity control program updated second gripper motor tach information obtained at said second time, and wherein said pivot motor tach provides to said velocity control program updated pivot motor tach information obtained at said second time, wherein the difference between said first time and said second time comprises the interrupt period.

6. The accessor of claim 5, wherein said interrupt period is between about 0.10 milliseconds and about 1.0 milliseconds.

7. The accessor of claim 6, wherein each interrupt period is about 0.5 milliseconds in duration.

8. A method to diagnose the failure of an accessor movably disposed within an automated data storage system, said accessor retrieving one of a plurality of data storage media stored in a plurality of storage slots in said automated data storage system and delivering that retrieved data storage media to one of one or a plurality of data storage drives for reading and/or writing data thereon, said method comprising the steps of:

(a) providing an accessor comprising a first gripper comprising a first gripper motor and a first gripper motor tach, a pivot mechanism comprising a pivot motor and a pivot motor tach, a velocity control program, and a revolving memory buffer;

(b) generating first gripper motor tach information at a first time using said first gripper motor tach;

(c) determining using said first gripper motor tach information, and storing in said revolving memory buffer, a first tach position, a first demand velocity, a first PWM voltage, and a first actual velocity;

(d) generating pivot motor tach information at said first time using said pivot motor gripper tach;

(e) determining using said pivot motor tach information, and storing in said revolving memory buffer, a third tach position, a third demand velocity, a third PWM voltage, and a third actual velocity;

(f) generating at a second time updated first gripper motor tach information and updated pivot motor tach information; and (g) determining if an accessor failure has occurred.

9. The method of claim 8, wherein said accessor further comprises a second gripper comprising a second gripper motor and a second gripper motor tach, said method further comprising the steps of:

(h) generating second gripper motor tach information at said first time using said second gripper motor tach;

(i) determining using said second gripper motor tach information, and storing in said revolving memory buffer, a second tach position, a second demand velocity, a second PWM voltage, and a second actual velocity;

(j) generating at said second time updated second gripper motor tach information.

10. The method of claim 9, wherein the difference between said first time and said second time comprises the interrupt period.

11. The method of claim 10, wherein said interrupt period is between about 0.1 milliseconds and about 1.0 milliseconds.

12. The method of claim 11, wherein said interrupt period is about 0.5 milliseconds.

13. The method of claim 9, further comprising the steps of:

(k) repeating steps (b) through (j) during a plurality of subsequent interrupt periods, so long as no accessor failure occurs; and (l) terminating generation of updated first gripper motor tach information, updated second gripper motor tach information, and updated pivot motor tach information, if an accessor failure occurs.

14. The method of claim 13, wherein said first demand velocity is determined by said velocity control program.

15. The method of claim 14, wherein said first PWM voltage is the pulse width modulated voltage applied to said first gripper motor in order to attain said first demand velocity.

16. The method of claim 15, wherein said first actual velocity comprises the velocity of said first gripper determined at said first time.

17. The method of claim 13, further comprising the steps of:

(m) providing an external computer;

(n) downloading data stored in said revolving memory buffer to said external computer;

(o) analyzing said downloaded data; and (p) determining the cause of said accessor failure.

18. The method of claim 17, wherein said external computer comprises a display device, said method further comprising the step of:

(q) graphically displaying said downloaded data on said display device.

19. The method of claim 17, wherein step (n) is performed using wireless communication.

20. An automated data storage system for storing and accessing a plurality of data storage media stored in a plurality of storage slots, said automated data storage system having at least one data storage drive for receiving said data storage media and reading and/or writing data thereon, said automated data storage system comprising:

one or a plurality of accessors for accessing and transporting said data storage media between said storage slots and said data storage drive, wherein said one or a plurality of accessors is moveably disposed within said automated data storage system;

wherein said one or a plurality of accessors each comprises:

an accessor control card having a revolving memory buffer;

a velocity control program stored on said accessor control card;

a first gripper disposed on said accessor;

a first gripper motor disposed on said first gripper;

a first gripper motor tach disposed on said first gripper motor, wherein said first gripper tach provides at a first time first gripper motor tach information to said velocity control program;

a pivot motor disposed on said accessor;

a pivot motor tach disposed on said pivot motor, wherein said pivot motor tach provides at said first time pivot motor tach information to said velocity control program;

wherein said velocity control program stores said first gripper motor tach information and said pivot motor tach information in said revolving memory buffer.

21. The automated data storage system of claim 20, further comprising:

a second gripper;

a second gripper motor disposed on said second gripper;

a second gripper motor tach disposed on said second gripper motor, wherein said second gripper tach provides at said first time second gripper motor tach information to said velocity control program;

wherein said velocity control program stores said first gripper motor tach information, said second gripper motor tach information, and said pivot motor tach information in said revolving memory buffer.

22. The automated data storage system of claim 21, wherein said one or a plurality of accessors each further comprise a wireless communication device.

23. The automated data storage system of claim 21, wherein said velocity control program determines and stores in said revolving memory buffer:

a first tach position, a first demand velocity, a first PWM voltage, and a first actual velocity using said first gripper motor tach information;

a second tach position, a second demand velocity, a second PWM voltage, and a second actual velocity using said second gripper motor tach information; and a third tach position, a third demand velocity, a third PWM voltage, and a third actual velocity using said pivot motor tach information.

24. The automated data storage system of claim 21, wherein said first gripper motor tach provides to said velocity control program updated first gripper motor tach information obtained at a second time, and wherein said second gripper motor tach provides to said velocity control program updated second gripper motor tach information obtained at said second time, and wherein said pivot motor tach provides to said velocity control program updated pivot motor tach information obtained at said second time, wherein the difference between said first time and said second time comprises the interrupt period.

25. The accessor of claim 24, wherein said interrupt period is between about 0.10 milliseconds and about 1.0 milliseconds.

26. The accessor of claim 25, wherein each interrupt period is about 0.5 milliseconds.

\* \* \* \* \*